(12) United States Patent
Jain

(10) Patent No.: US 7,195,375 B2
(45) Date of Patent: Mar. 27, 2007

(54) COMPACT, HIGH-EFFICIENCY, ENERGY-RECYCLING ILLUMINATION SYSTEM

(75) Inventor: Kanti Jain, Hawthorne, NY (US)

(73) Assignee: Anvik Corporation, Hawthorne, NY (US)

( * ) Notice: Subject to any disclaimer, the term of this patent is extended or adjusted under 35 U.S.C. 154(b) by 254 days.

(21) Appl. No.: 10/766,406

(22) Filed: Jan. 28, 2004

(65) Prior Publication Data

US 2005/0162853 A1 Jul. 28, 2005

(51) Int. Cl.
*F21V 7/00* (2006.01)
(52) U.S. Cl. .................. 362/301; 362/298; 362/346; 362/551; 359/861; 385/133
(58) Field of Classification Search .......... 362/298, 362/301, 302, 304, 346, 551; 359/857, 861, 359/894; 385/133
See application file for complete search history.

(56) References Cited

U.S. PATENT DOCUMENTS

| 4,747,030 A | * | 5/1988 | Offner et al. ............... 362/302 |
| 6,324,330 B1 | * | 11/2001 | Stites ........................ 385/133 |
| 6,332,688 B1 | * | 12/2001 | Magarill .................... 362/302 |

* cited by examiner

*Primary Examiner*—Stephen F Husar
(74) *Attorney, Agent, or Firm*—Carl C. Kling

(57) ABSTRACT

A compact light-beam homogenizer is realized by multiple reflections within internally-reflecting optical channels which are arranged in a folded configuration. The optical channels may be hollow with mirrored walls, or made of a solid transparent optical material. Light enters through an apertured mirror whose internally reflective surface sends back-reflected rays forward for recycling. Multiple entry ports may be provided for combining several beams or for reducing the intensity in the channels. The homogenizer may be used in reverse as a beam divider. Different shapes of the optical channels are provided for obtaining an effective emission surface of different shapes. Due to reflections from surfaces that are parallel to the optical axis, the numerical aperture of the input beams is preserved.

41 Claims, 11 Drawing Sheets

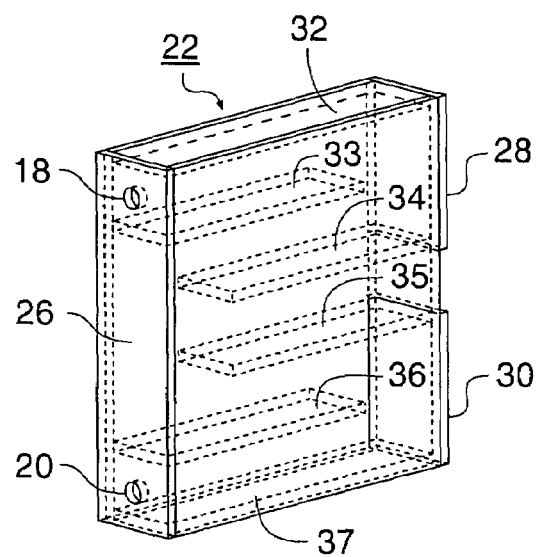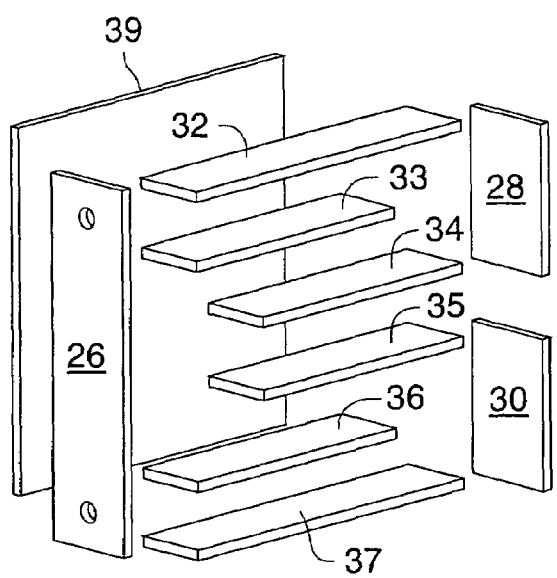
Fig. 2　　　　Fig. 3
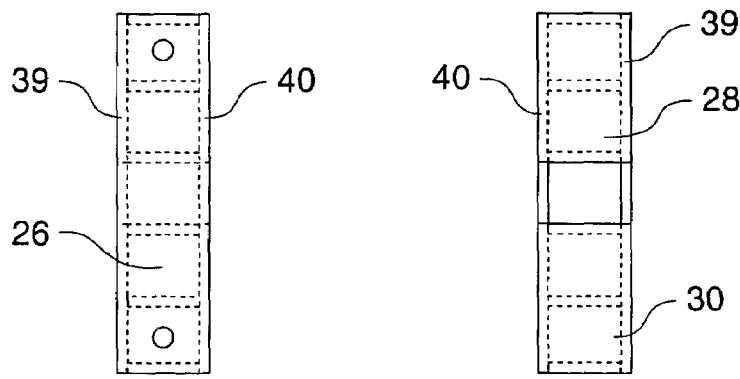
Fig. 4

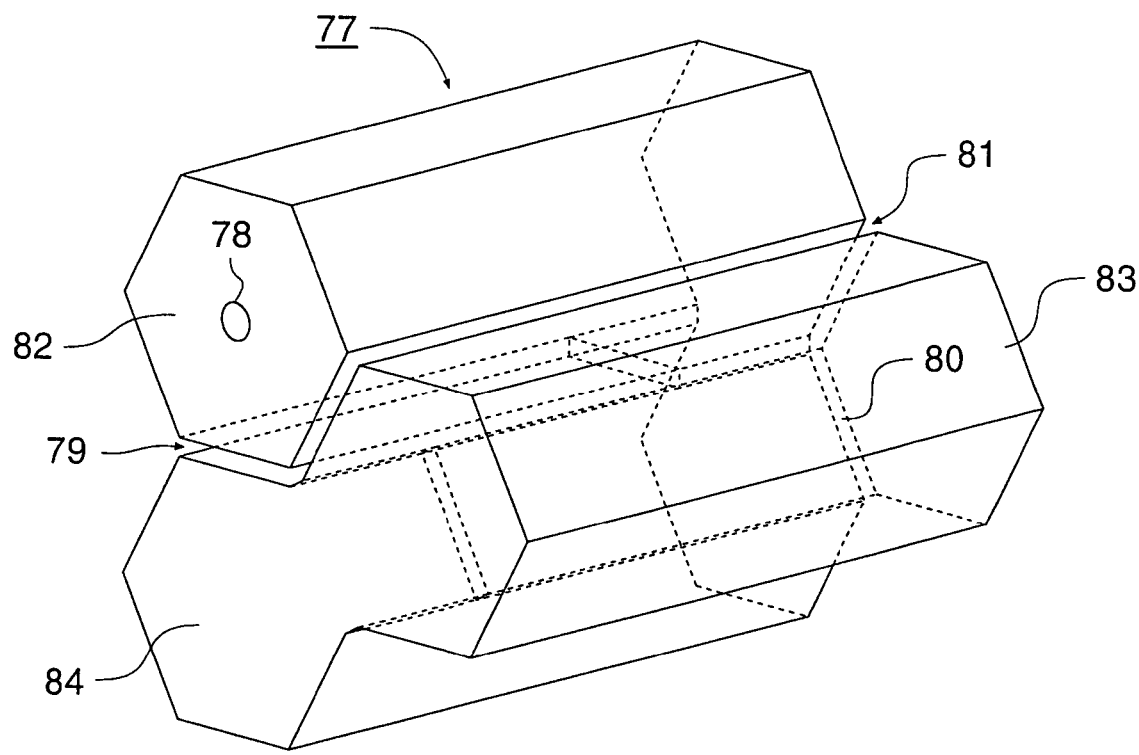
Fig. 17
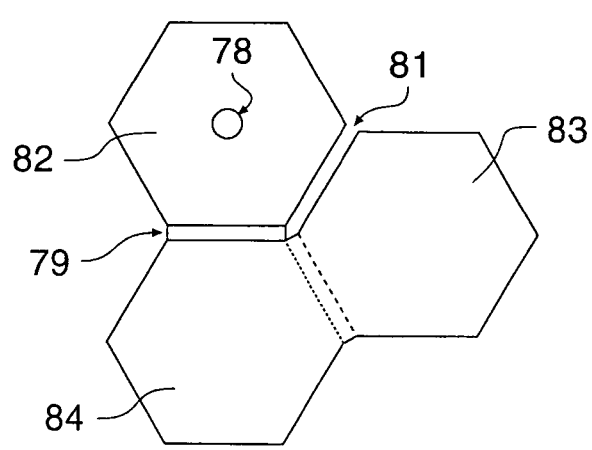 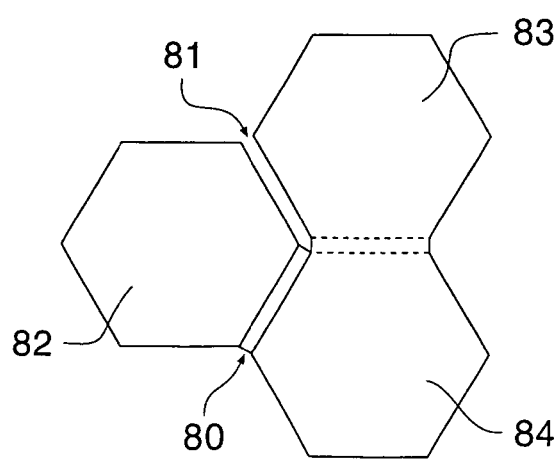
Fig. 18  Fig. 19

COMPACT, HIGH-EFFICIENCY, ENERGY-RECYCLING ILLUMINATION SYSTEM

(1) FIELD OF THE INVENTION

This invention relates to illumination systems for projectors, exposure systems, and other devices requiring a laser or lamp source, and specifically relates to illumination systems in which it is an important requirement to make the spatial uniformity of the beam high and the utilization of the light very efficient.

(2) BACKGROUND OF THE INVENTION

A key subsystem in numerous optical systems for a variety of applications is an illumination system which comprises a light source, such as a laser or a lamp, and several optical components, such as mirrors and lenses, to collect, shape and relay the light from the source to the desired destination. For example, in a projector, light from an arc lamp is collected, made uniform, and made to illuminate an object, such as film or a programmable spatial light modulator, which is then imaged onto a display screen. As another example, in a laser lithography system, light from an excimer laser is collected, made uniform, shaped into a specific cross-section, is made to illuminate a photomask having a pattern, the mask being then imaged by a projection lens onto a substrate such as a semiconductor wafer or a display panel, coated with a layer of a photosensitive medium.

In all of these applications, the intensity of the light illuminating the object must be very uniform spatially. The object, as stated earlier, is, for example, a spatial light modulator (SLM) chip in a projector, or a photomask in a lithography system. Spatial uniformity of a light beam means that the cross-sectional profile of the intensity must be substantially flat. A second important requirement on the illumination system is that its efficiency must be as high as possible so that loss of light is minimized and the smallest possible lamp or laser light source may be incorporated in the optical system, or, alternatively, the highest possible energy may be obtained at the destination surface, such as the display screen or the semiconductor wafer.

Other highly desirable features in an illumination system include compact size and self-luminosity. The importance of a compact size of the illumination system is self-evident—it enables the whole optical system to be compact, and therefore, low-weight, more portable, etc. Self-luminosity of a light source means it is equivalent to an emission surface on which every point behaves effectively as an emission point from which light rays emanate in a specific numerical aperture. Such a characteristic is especially important when the illuminated object must be subsequently imaged with high resolution onto another surface. All of the above desirable features of illumination systems are important in the case of digital projections, lithography systems, and numerous other optical systems.

A widely used device for uniformizing the beam in an illumination system is a homogenizer in the shape of a light tunnel with a square, rectangular or hexagonal cross-section. Rays of an input light cone undergo multiple reflections between pairs of parallel mirror strips, causing random mixing of the rays and thereby uniformizing the beam. Such devices are employed in a variety of exposure systems and projectors.

In color projectors, the illumination beams of the three primary colors (red, green and blue) are produced by separating the broad-band (white) light of an arc lam or a halogen lamp by a segmented color wheel. Such a wheel, in a given position, allows only one of the colors to be transmitted, the others being blocked and lost. In a lithography system, the laser light incident on a mask is only partially utilized—only that portion of the light which falls on the transmissive regions of the mask is imaged by the projection lens and reaches the substrate. The majority of the light that falls on the opaque portions of the mask is blocked and lost.

An effective technique to minimize the loss of light described in the preceding paragraph is an "energy-recycling" homogenizer. Such a device has an apertured mirror at its input face. The cone of light from the source (lamp or laser) enters the homogenizer through the aperture and is uniformized by multiple reflections as in the conventional light-tunnel homogenizer. However, light rays reflected back from the color wheel (in a color projector) or the photomask (in a lithography system) are made to enter the homogenizer in the backward direction. These rays, when reaching the internal mirror surface surrounding the aperture at the input plate, are re-reflected to travel in the forward direction again, thus being re-utilized.

In all such illumination systems using a light-tunnel type of homogenizer, the longer the homogenizer, the more the number of reflections within, the greater the mixing of the rays, and therefore, the greater the uniformity of the output beam. However, an undesirable feature of such a homogenizer is that the size of the illumination system becomes larger. This is especially a significant disadvantage in the design of electronic projectors, for which small size of the illumination module is a highly attractive attribute, so that they can be made more compact, lower-weight, and more portable. This invention discloses novel illumination systems with very compact, high-efficiency, energy-recycling beam homogenizing devices. It also discloses compact homogenizing modules as beam-combining devices for efficiently combining the outputs of two or more light sources. Dividing a single input beam into multiple beams is also described.

SUMMARY OF THE INVENTION

This invention provides a compact homogenizer by reconfiguring a light-tunnel type of homogenizer such that its straight length is folded multiple times in a zigzag fashion. The total length of the unfolded light-tunnel is such that the desired number of reflections are obtained for the required level of intensity uniformization. The folding of the light-tunnel converts the long configuration of the conventional device into a very compact module. Additionally, the input beam may be split into two or more beams, each of which may go through a folded homogenizer, and the separate folded homogenizers may be combined into one module by making their last arm common. Each beam entry port—one, two, or more, as the case may be—has an apertured mirror at its input face for energy recycling. The multi-port device may also be used as a beam combining device for adding the output of two light sources without the use of devices such as beamsplitters. When used as a compact energy-recycling homogenizer in an illumination system, the multi-port configuration provides greater beam uniformity and smaller size.

For entry into the port, light from a lamp source is collected by a curved mirror, such as an ellipsoidal mirror, and focused near the entry aperture of the port. For entry into multiple ports, the collected light is collimated and split into multiple equal beams by tilted flat slabs or rhombs which deviate and displace the component beams which are then focused by individual lenses. Light from a laser source is likewise focused, or split and focused, into the entry ports.

The exit face of the compact homogenizer acts as the effective source plane that is self-luminous and emits into the desired numerical aperture. The exit face is imaged onto the relevant "object" of the rest of the optical system, e.g., a spatial light modulator or a photomask.

The reflecting inner surfaces of the homogenizer may be mirrored surfaces or coated with multilayer dielectric films designed for high reflectivity. Alternatively, the homogenizer tunnels may be constructed of a solid optical material, such as glass, fused silica, or acrylic, in which reflections at the walls take place by total internal reflection. Each of these configurations of the compact, high-efficiency, energy-recycling illumination system is described in detail in the section "Detailed Description of the Embodiments."

BRIEF DESCRIPTION OF THE FIGURES

FIG. 2 shows details of the construction of a compact, hollow homogenizer with two entry ports.

FIG. 3 shows the different components that make up the dual-port, hollow homogenizer of FIG. 2.

FIG. 4 shows the head-on views of the input and output faces of the homogenizer of FIG. 2.

FIG. 17 shows a more compact configuration of a hexagon-shaped solid homogenizer.

FIGS. 18 and 19 show the head-on views of the input and output faces of the hexagonal homogenizer of FIG. 17.

DETAILED DESCRIPTION OF THE EMBODIMENTS

Figure 1:
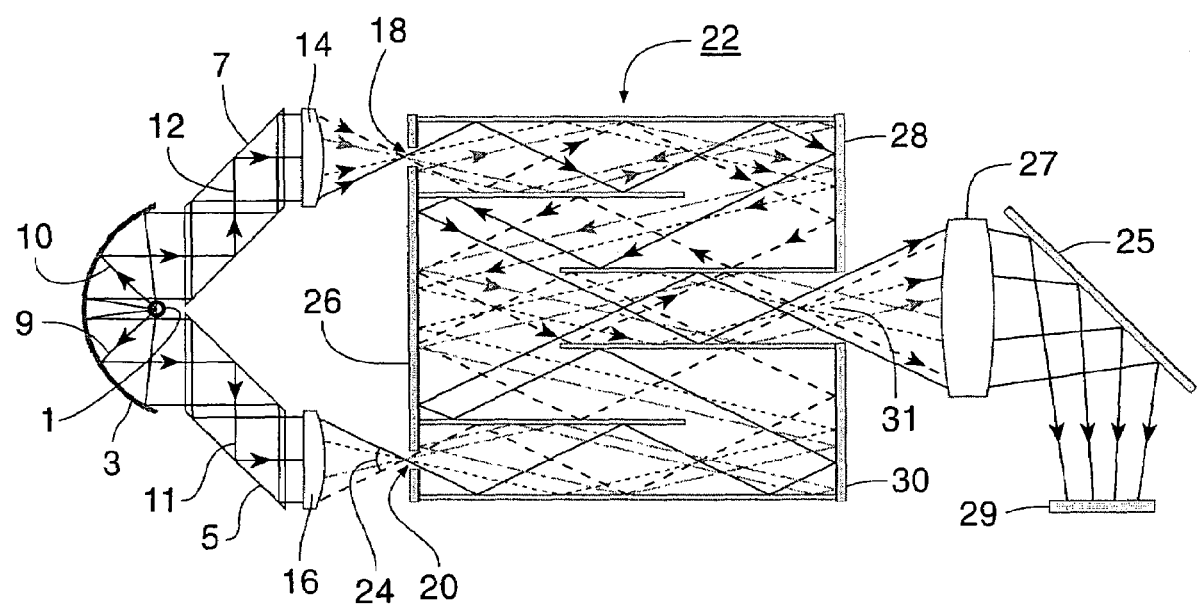
FIG. 1 is a schematic illustration of a compact, high-efficiency, energy-recycling illumination system having a beam homogenizer with two entry ports and made in a hollow configuration.

A preferred embodiment of the invention is illustrated in FIG. 1. Light from a lamp 1 as light source is collected by curved reflector 3 and is directed toward two optical rhomb elements 5 and 7. Although rhomb elements are shown as a preferred method of beam splitting, other devices, such as tilted optical flats, will also provide the necessary function. The curved reflector is designed to provide a nearly collimated beam of light. Although it is preferred that the curved reflector make the collected beam collimated, it is not essential, for collimation may be easily accomplished by a simple lens element. The two rhombs 5,7 are placed in close proximity so as to receive nearly all the light from the lamp source 1. As shown in FIG. 1, the input beam gets split in two separate beams by the rhombs 5,7, which displace the two beams laterally and direct them parallel to the original optical axis. To further identify the different beams, rays 9 and 10 are part of the full beam, whereas rays 11 and 12 are each part of one of the split beams.

Each of the split beams is focused by a focusing lens 14 or 16 near the entrance of the two aperture ports 18, 20 of the compact homogenizer assembly 22. The focusing lenses 14 and 16 focus the light rays into a specified angle, for example angle 24, that defines the numerical aperture of the light bundle.

Compact Homogenizer Construction

The compact homogenizer assembly 22 is made of a set of mirror strips and mirrored glass plates. Alternatively, it may also be made of a solid block of a suitable optical material, such as glass, fused silica or acrylic. Details of the construction of the homogenizer module are illustrated with the help of FIGS. 1 and 2. I first describe the construction using mirror strips and plates. This results in what I shall call a "hollow homogenizer." Referring to FIG. 2, the input face of the hollow homogenizer is a mirror strip 26 whose inside surface is mirrored. It has two holes 18, 20 which serve as entry ports for the two focused cones of light, as illustrated in FIG. 1. This input face mirror strip is shown separately in FIG. 3. The output face of the hollow homogenizer is comprised of two mirror strips 28, 30 whose inside surfaces (i.e., those facing the strip 26) are mirrored. As can be seen in FIGS. 1, 2 and 3, the planes of the input face mirror strip and the output face mirror strips 28, 30 are vertical, and perpendicular to the primary optical axis of the device, which axis is horizontal. Between the input face mirror strip 26 and the output face mirror strips 28, 30 are six horizontal mirror strips, shown as 32, 33, 34, 35, 36 and 37. The mirror strips 32 and 37 are mirrored on the inside, whereas the strips 33, 34, 35 and 36 are mirrored on both sides. Note that mirror strips 33, 34, 35 and 36 are shorter in length than mirror strips 32 and 37. In the assembled state, the left edges of strips 33, 36 are in contact with the input face of strip 26, whereas the right edges of strips 34 and 35 are in contact with, respectively, the output face mirror strips 28 and 30.

All of the above mirror strips 26, 28, 30 and 32–37 are mounted as sandwiched between mirrored glass plates 39 and 40. This is more clearly illustrated in FIG. 4, which shows the head-on views of the input face strip 26 and the output face strips 28, 30. The assembly of all of the above components may be accomplished by a suitable adhesive.

Compact, Solid Homogenizer Construction

Figure 5:
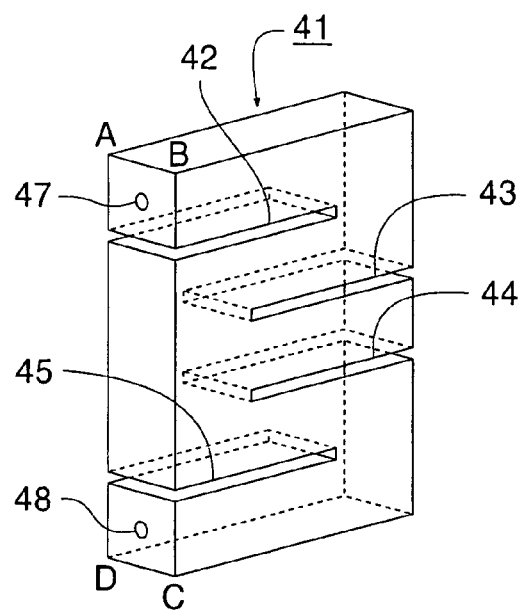
FIG. 5 is an illustration of a compact, high-efficiency, energy-recycling, solid homogenizer constructed of an optical material such as fused silica, glass or acrylic.
Figure 6:
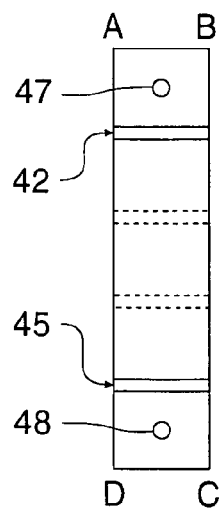
FIGS. 6 and 6A show, respectively, the head-on views of the input and output faces of the homogenizer of FIG. 5.
Figure 6A:
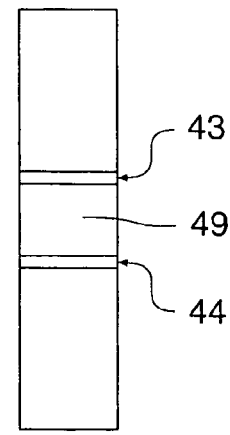

We next describe the construction of the compact solid homogenizer according to the invention. As shown in FIG. 5, the solid homogenizer is made from a single block 41 of a suitable optical material, such as fused silica, glass or acrylic. In this solid block 41 are made four thin slots 42, 43, 44 and 45 and surfaces thus formed are polished smooth by chemical means or mechanical means or by a combination of the two. These slots then help define the five solid arms of the zigzag tunnel. Additionally, the input face ABCD of the solid block is coated with a metallic layer to be highly reflective except for two small circular regions 47, 48, which serve as the entrance "ports" for the input beams. Note that these "holes" in the metallized surface provide entry for the input beams into the solid body of the two arms (uppermost and lowermost) of the homogenizer. The exit faces of the homogenizer are also mirrorized, as are the upper, lower and side faces. The output channel of the homogenizer is shown as 49 in FIGS. 6 and 6A, which present the head-on views of the input and output faces of the solid homogenizer configuration. Note that the exit face of port 49 is not mirrored; in fact, it is preferable to coat it with a multilayer anti-reflection coating.

Reflection of light rays in the channels of the solid homogenizer takes place by total internal reflection (TIR). This phenomenon takes place when the input numerical aperture is such that the angle of incidence of all rays striking each surface parallel to the optical axis is greater than the critical angle, which is given by $$\alpha = \sin^{-1}(1/n),$$

where n is the index of refraction of the solid material. In almost all applications, this condition is readily satisfied. When it is not, the horizontal surfaces can be mirrorized. I remark that mirrorizing the horizontal surfaces (along with the vertical surfaces) may be advantageous even when total internal reflection is feasible.

Reduction in Number of Components

Figure 7:
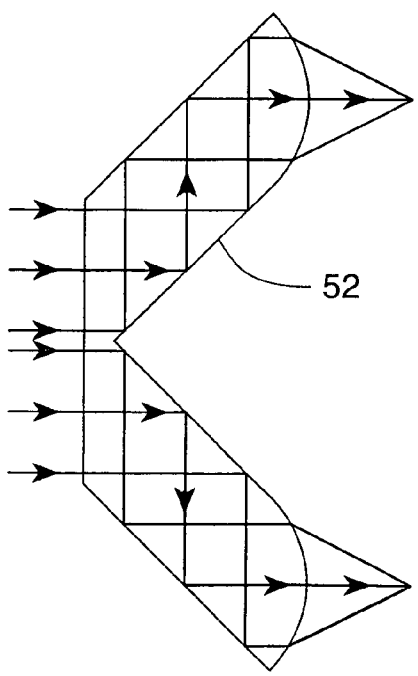
FIG. 7 is a schematic illustration of the four beam-splitting optical elements of FIG. 1 configured into one composite element for ease of fabrication.

The embodiment in FIG. 1 shows four optical elements in the light collection part of the illumination system. These four optical elements may be fabricated as one single unit, as illustrated in FIG. 7. Note that the four elements of FIG. 1, namely the rhombs 5, 7 and the lenses 14, 16, are combined into one unit 52 in FIG. 7. Thus, with the light collection and shaping module of FIG. 7 and the homogenizer module of FIG. 5, the entire optics for the illumination system may be reduced to two subassemblies, recycling/combining homogenizer subassembly 41 and beam separating subassembly 52.

Compact, Single-Entry-Port Configuration

An important advantage of the dual-entry-port configuration of FIGS. 1, 2 and 5 is that the total light energy is channeled into two paths, and therefore, the intensity in each path is halved. This is beneficial because there will be less heating of the walls of the homogenizer, as well as its bulk material in case of the solid homogenizer configuration.

Figure 8:
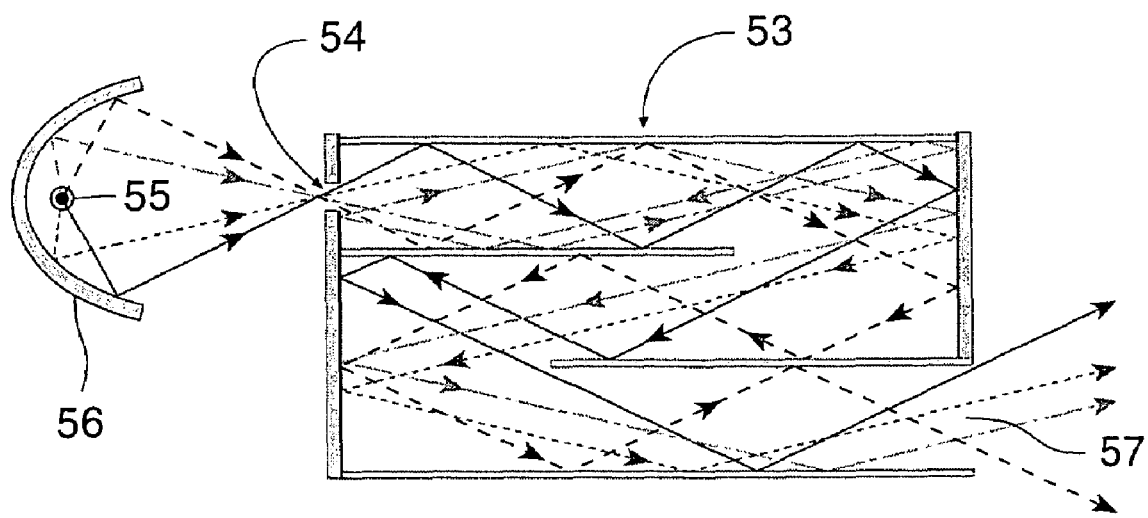
FIG. 8 illustrates a compact, single-entry-port homogenizer of hollow construction, and light from a lamp source collected and coupled into it.
Figure 9:
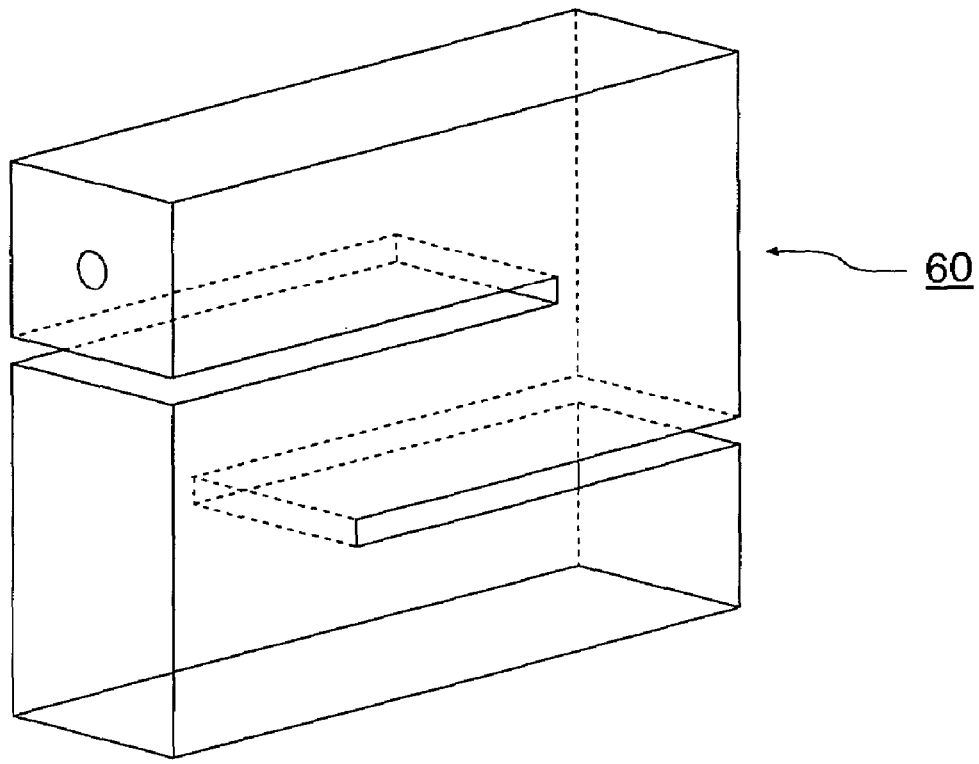
FIG. 9 is an embodiment showing a compact, solid homogenizer with a single entry port and slots cut to form separate beam-uniformizing channels.

In many applications, the total intensity of the beam from the source may not be very high; consequently, heating of the surfaces or the bulk of the homogenizer may not be an issue. In such a situation, a homogenizer with a single entry port may be a preferred configuration. Such an embodiment is shown in FIG. 8. It shows the homogenizer 53 with three arms configured in a reversed S-shape. The homogenizer has one entry port 54 into which light from lamp 55 is focused by ellipsoidal reflector 56. Uniformized light exits from exit face 57. The construction shown in FIG. 8 is of a compact, single-entry-port, hollow homogenizer. FIG. 9 shows a solid construction 60 in a fashion similar to the solid construction 53 shown in FIG. 5.

In all configurations of the compact homogenizer, whether with two entry ports (FIGS. 1, 2, 5) or with one entry port (FIGS. 8, 9), and whether of hollow construction (FIGS. 1, 2, 8) or of solid construction (FIGS. 5, 9), the light emerging from the exit port (e.g., 31 in FIG. 1 or 57 in FIG. 8) is directed toward an object plane. This may be, for example, a spatial light modulator chip in a projector, or a photomask in a lithography tool. This is done by a projection lens, which images the exit port of the homogenizer onto the object. This is illustrated in FIG. 1, where projection lens 27 images the exit port 31 onto spatial light modulator chip 29, after folding by fold mirror 25.

Compact Quad Homogenizer

Figure 10:
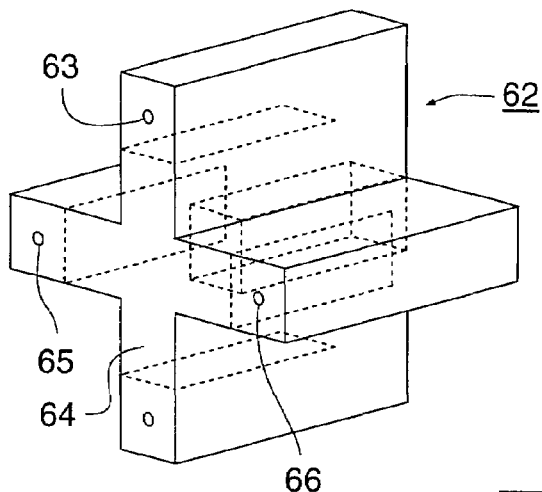
FIG. 10 illustrates a hollow quad homogenizer with four entry ports for reducing the beam intensity in each arm and for combining multiple beams.
Figures 11, 11A:
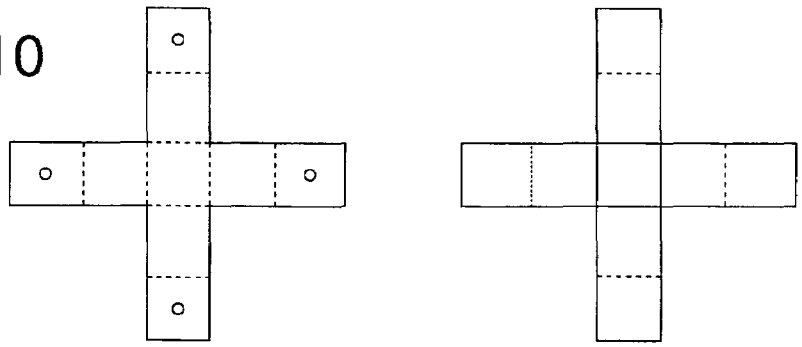
FIGS. 11 and 11A show head-on views of the input and output faces of the quad homogenizer of FIG. 10.

An embodiment of the invention as a quad homogenizer is shown as 62 in FIG. 10. Compared to the two entry ports in the configuration of FIG. 2, this embodiment has four entry ports 63, 64, 65 and 66. Each pair of oppositely situated entry ports accepts light cones in two of the four arms, and the entering rays are randomly mixed to achieve the beam uniformization. Note that some rays entering in one pair of opposing ports and traveling in the corresponding five hollow channels may reflect into some channels corresponding to the other pair of entry ports, but substantially all rays eventually emerge from the exit port. FIGS. 11 and 11A show the head-on views of the input face and output face of this hollow quad homogenizer.

Figure 12:
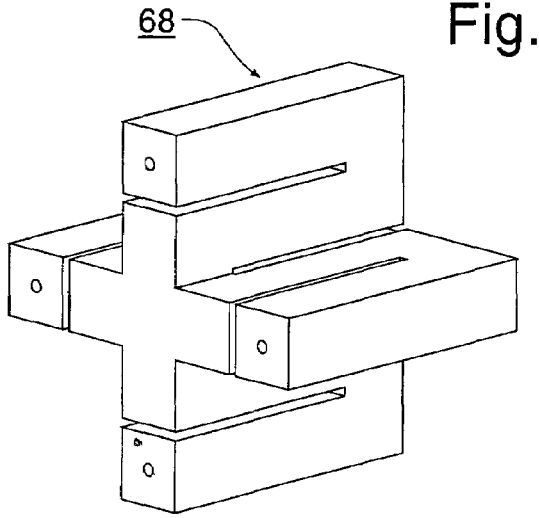
FIG. 12 illustrates a solid embodiment of the quad homogenizer of FIG. 10, showing four entry ports and slots cut to separate the different internally reflecting channels.

A solid embodiment of the quad homogenizer is shown as 68 in FIG. 12. This is made of a solid block of a suitable optical material, e.g., fused silica, glass or acrylic. Its construction is similar to the embodiment shown in FIG. 5, except that now there is another set of entry ports and corresponding channels in which light rays mix randomly by total internal reflection. As mentioned in reference to FIG. 5, the homogenizer of FIG. 12 may be mirrored on all its surfaces, except for its entrance port holes and exit port, for cost-effective construction. Further, it would be advantageous to coat the entrance port holes and the exit port with an anti-reflection coating to eliminate the approximately 4% loss that occurs in transmission through uncoated glass surfaces.

Treatment of Central Rays

Figure 13:
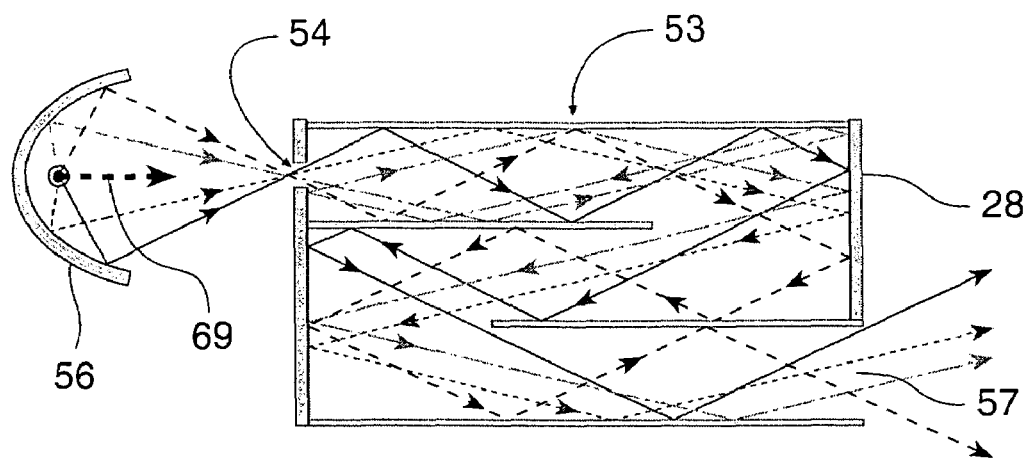
FIG. 13 presents the homogenizer embodiment previously shown in FIG. 8, here illustrating the problem of handling the central ray bundle.
Figure 14:
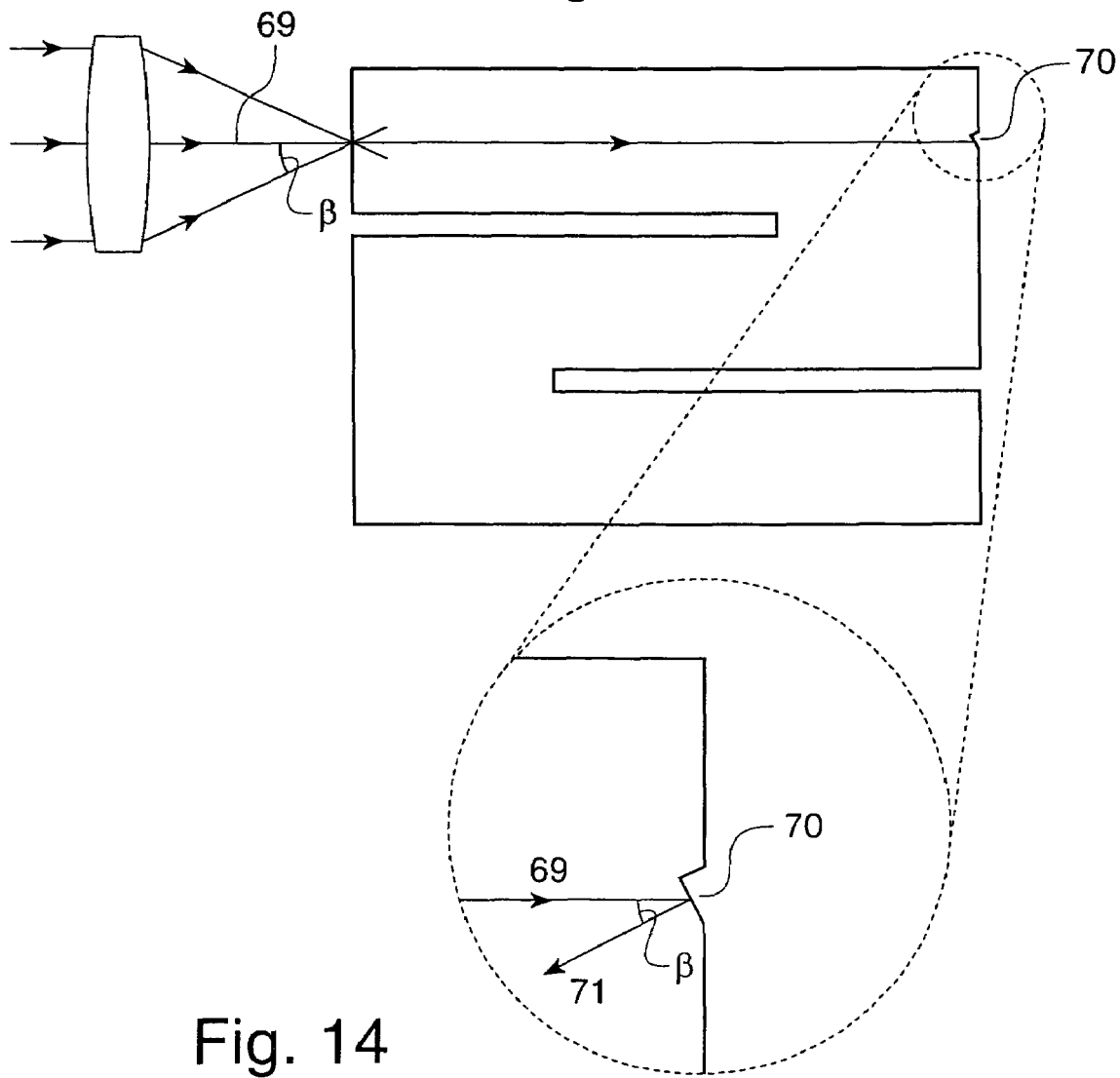
FIG. 14 illustrates the inclusion of a small indented cone on the exit face of the homogenizer to deflect the central rays at a desired angle to enable their collection.

I illustrate how the invention utilizes the central rays (i.e., those emitted by the lamp along the primary optical axis). As shown in FIG. 13, a central ray 69 would enter the homogenizer through the entry port 54, travel parallel to the horizontal surfaces, strike mirrored wall 28, and would be reflected back out through the entry port, thus never reaching to the second arm of the homogenizer, and therefore being lost. This loss is prevented by the technique illustrated in FIG. 14. The central ray 69 travels parallel to the optical axis and strikes the back reflecting surface. In the region where the central ray 69 strikes the back surface, there is a small, conical indentation 70 whose surfaces are mirrored. The central ray 69 will hit a wall of this conical indentation and be reflected at an angle $\beta$. The angle of the indent cone is so designed that the angle $\beta$ is equal to the angle of the light cone entering the homogenizer. Thus, the central ray is effectively utilized and, moreover, its angular position is maintained within the original cone of light, thus preserving the NA-preserving property of the homogenizer. Note that FIG. 14 has illustrated this embodiment for a solid homogenizer; it is likewise implemented for a hollow homogenizer, with a similar cone on the mirrored wall of the output face. The base diameter of the cone may be of the order of one-tenth of the width of one channel.

Compact Homogenizer with Hexagonal Cross-Section

Figure 15:
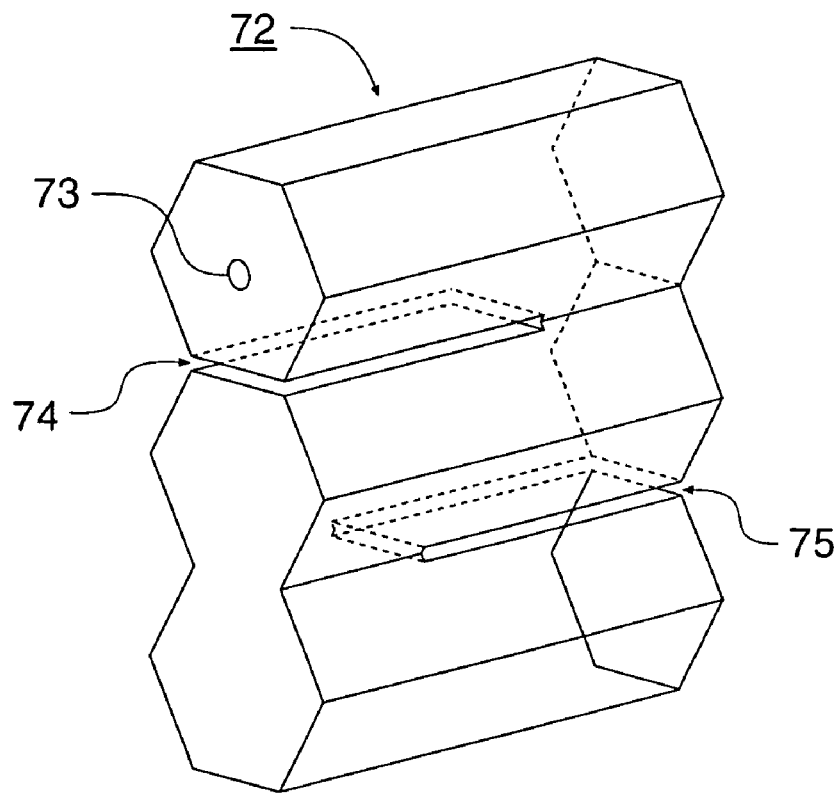
FIG. 15 presents a compact solid homogenizer whose reflecting arms have a hexagonal cross section.

The embodiments presented in FIGS. 1–14 show a square or rectangular cross-section of each of the light tunnels. This invention also lends itself well to configure shapes of light tunnels other than rectangular or square. FIG. 15 illustrates an embodiment with hexagon-shaped channels according to this invention. An illumination beam with a uniform hexagonal cross-section is of great benefit in seamless scanning exposure systems in which consecutive scans with the hexagonal beam provide overlapping complementary exposure dose to enable seamless and uniform exposure of a large-area substrate.

Figures 16, 16A:
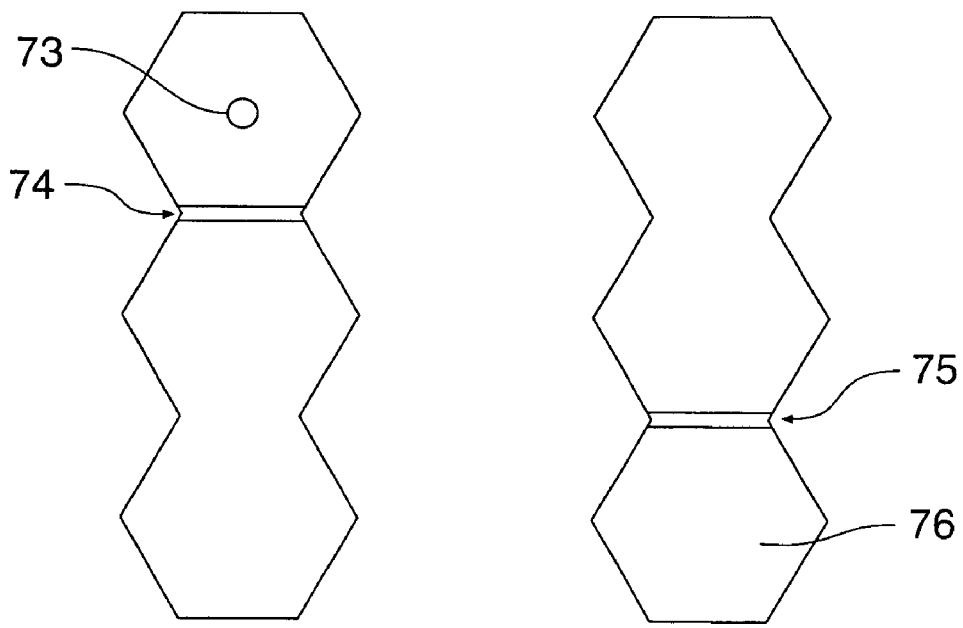
FIGS. 16 and 16A show the head-on views of the hexagon-shaped solid homogenizer of FIG. 15.

A compact, solid, hexagonal homogenizer 72 is shown with three arms, similar to the rectangular embodiment of FIG. 9. The input light cone enters through entry port 73. Reflecting walls between the channels are realized by slots 74, 75 which result in total-internal-reflection surfaces as in the embodiments of FIGS. 5, 9 and 12. The head-on views of the input and output faces of the homogenizer are shown in FIGS. 16 and 16A. Note that the exit port is the face 76 of the bottom tunnel, and it is unmirrored, and preferably anti-reflection coated.

Another embodiment of the hexagonal construction is shown in FIGS. 17, 18 and 19. The homogenizer 77 has slots 79, 80 and 81 to separate the reflecting tunnels. Light entering through entry port aperture 78 is uniformized by multiple bounces first in arm 82, then in arm 83, and finally in arm 84, from which it exits.

Homogenizer Embodiments with Embedded Channels

Figure 20:
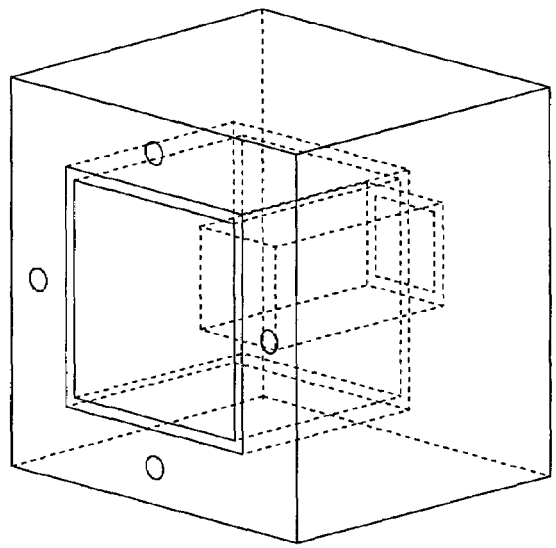
FIG. 20 illustrates an embodiment of a square solid homogenizer with embedded construction in which the innermost reflecting channel is surrounded by channels of square-ring-shaped cross-section.
Figure 20A:
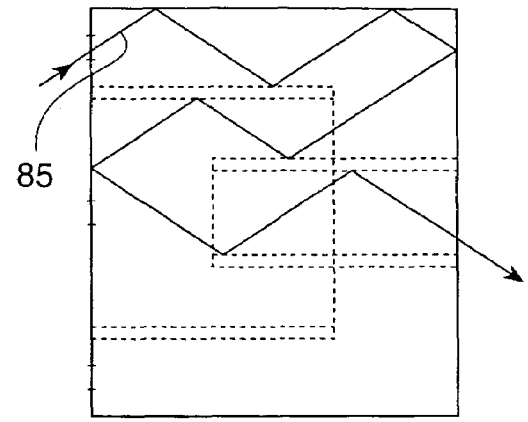
FIG. 20A presents a side view of the homogenizer of FIG. 20, showing the slot cuts that separate the three embedded reflecting channels.
Figure 21:
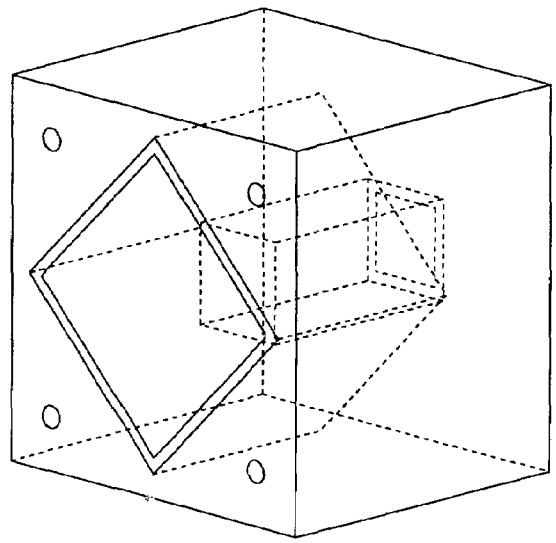
FIG. 21 shows a different embodiment of the square embedded homogenizer with the middle square-ring-shaped channel turned by 45 degrees to make the construction more compact.

Building on the concepts described in the preceding pages and illustrated in FIGS. 1–19, it is logical to conceive many additional embodiments. Two such embodiments, which use embedded internally reflecting channels, are shown in FIGS. 20 and 21. In FIG. 20, a square channel is embedded in a second square-ring-shaped channel that surrounds the first channel, and the second channel is embedded within an even larger square-ring-shaped channel. Light cones enter through entry ports as before. Separation between channels is also achieved as before by slots—except in this embodiment the slots are also square-ring-shaped. A side view is shown in FIG. 20A, which also shows a representative ray path 85.

Figure 22:
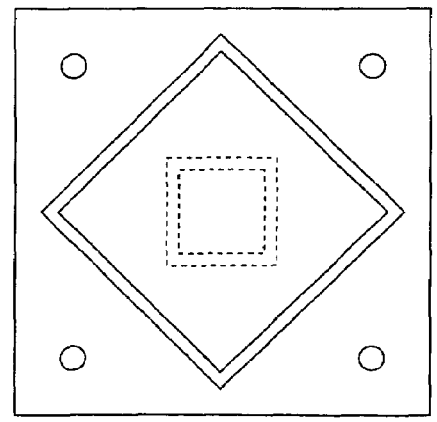
FIG. 22 is a head-on view of the input face of the homogenizer of FIG. 21.

FIG. 21 shows the square embedded configuration with the middle square-ring-shaped channel so arranged that its reflecting surfaces parallel to the optical axis make a 45° angle with the other two channels. FIG. 22 shows a view of the front face of the unit.

Figure 23:
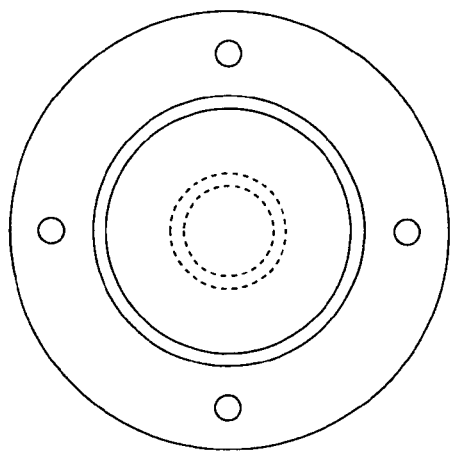
FIG. 23 is an embodiment of the embedded solid homogenizer with circular channels.
Figure 24:
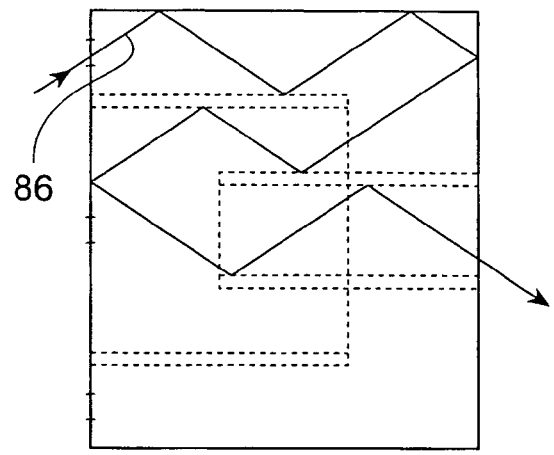
FIG. 24 is a side view of the embedded circular solid homogenizer of FIG. 23.
Figure 25:
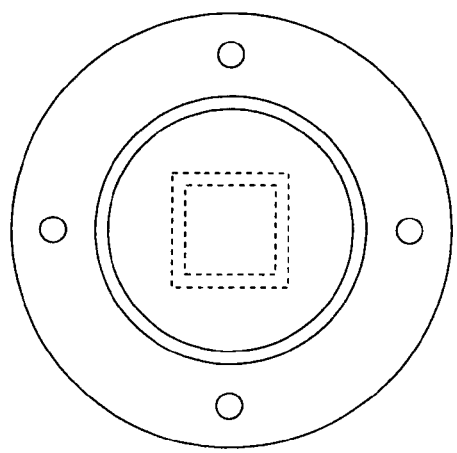
FIG. 25 is an illustration of a solid, embedded circular homogenizer similar to that of FIG. 23 but with a square innermost channel to produce a square illumination field.
Figure 26:
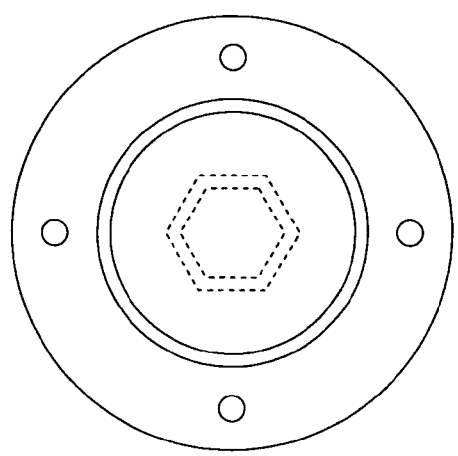
FIG. 26 shows a solid, embedded circular homogenizer similar to that of FIG. 23 but with a hexagon-shaped innermost reflective channel to produce a hexagonal illumination field.

An embodiment with three embedded circular channels is shown in FIG. 23, and its side view in FIG. 24. FIG. 24 shows a representative ray path 86. An embodiment with a square innermost channel and two surrounding circular-ring-shaped channels is shown in FIG. 25. A similar embodiment with a hexagonal innermost channel is shown in FIG. 26.

Beam Combining

Figure 27:
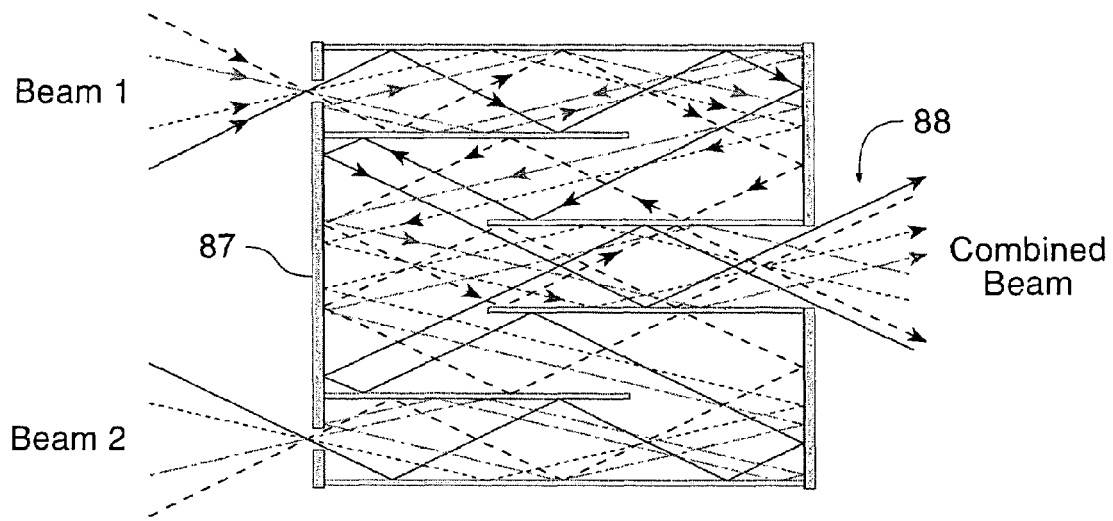
FIG. 27 illustrates the function of a multi-port compact homogenizer as a beam-combining device, showing two beams of specified numerical apertures entering the unit and exiting as a uniform, combined beam of the same numerical aperture.

A very useful function of the multi-port embodiment of the present invention is its ability to combine the beams from two or more sources into a single beam without the use of a beamsplitter, without any loss from additional elements, and without altering the numerical aperture. As shown in FIG. 27, Beam 1 and Beam 2 enter the beam combining homogenizer 87 into their respective entry ports with the specified numerical apertures. The rays from the two beams get randomly mixed by the multiple reflections in the homogenizer channel arms and emerge as a single bundle 88 with the same numerical aperture.

This useful function is of great interest in numerous applications in optics and materials processing with lasers. For example, in some applications, higher fluence is needed than available with one laser source. The device of this invention enables adding the beams from multiple laser sources. If desired, two sources of different wavelengths can be added to be incident collinearly on the same object surface. Such is the situation, for example, when one beam is meant for causing a process to take place in a material, whereas the other beam is such that it is desired that it not cause a process to occur, being for viewing or illumination only. Yet another application involves the addition of two beams such that the fluence from one beam is just below the threshold for a process to occur, and the other beam causes the transition to a regime in which the process takes place. As will the evident to one skilled in optics or processing, such a beam-combining device will be useful in numerous other applications.

Beam Division

Figure 28:
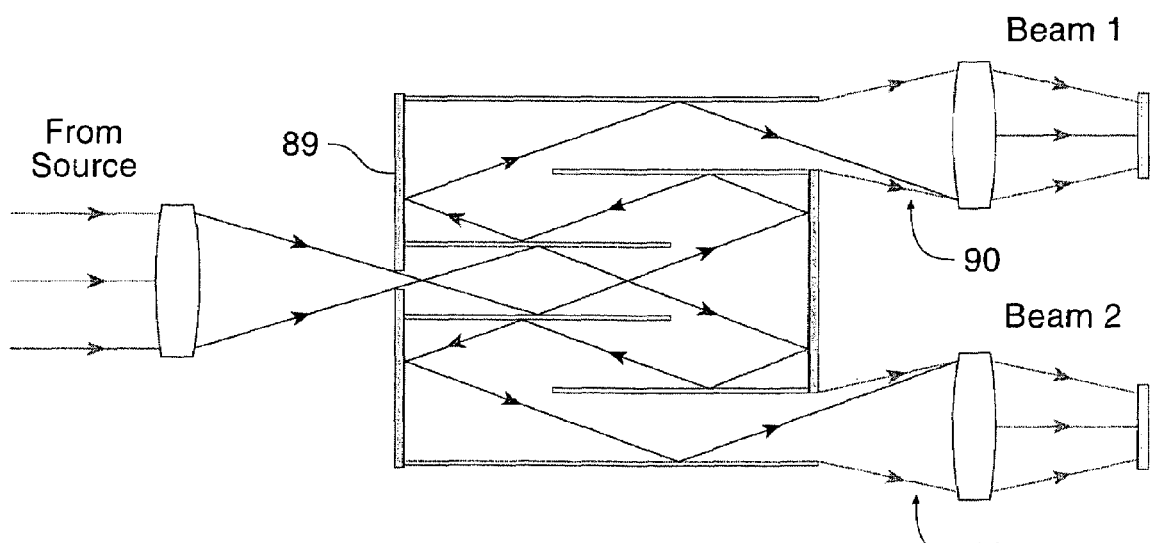
FIG. 28 illustrates the function of the multi-port compact homogenizer as a beam-dividing device, showing a single beam of a specified numerical aperture entering the unit and exiting as two uniformized beams of the same numerical aperture.

From the illustration of FIG. 27 and the discussion of beam combining, it is at once evident that the device of FIG. 27 can be used in an optically reversed direction to serve as a beam-dividing device. The embodiment of the invention as a beam-dividing device is illustrated in FIG. 28. Such an optical module is useful as a beam divider 89, when, for example, a high-power light source is to be shared by two lithography systems, each receiving a share of the total power from the source as a respective one of beams 90 and 91.

It is evident that many additional configurations may be visualized without departing from the spirit and scope of the invention.

The invention claimed is:

1. A compact, energy-recycling homogenizer module for use in an illumination system characterized by:
    a) folded optical channel means having at least one entry position and an exit position,
    b) entry port means at said folded optical channel entry position;
    c) a plurality of parallel, internally-reflective longitudinal surfaces in said folded optical channel;
    d) a plurality of internally-reflective latitudinal surfaces in said folded optical channel, perpendicular to said longitudinal surfaces; and
    e) exit port means at said folded optical channel exit position;
    whereby such folded optical channel provides a complex multi-reflection uniformizing effect as most rays of a bundle of light rays in an entering beam travel with multiple complex internal reflections from entry means to exit means, and some light rays that are reflected back toward said entry port means are re-reflected in the forward direction and returned for recycling.

2. A compact, energy-recycling homogenizer module according to claim 1, further characterized in that:
    said optical channels are hollow and said internally-reflecting surfaces are mirrored surfaces.

3. A compact, energy-recycling homogenizer module according to claim 1, further characterized in that:
    said optical channels are solid, made of a bulk optical material, and internal reflections in such solid channels take place by the phenomenon of total internal reflection.

4. A compact, energy-recycling homogenizer module according to claim 1, further characterized in that:
    said optical channels are solid, made of a bulk optical material with mirrored internally-reflecting surfaces causing such internal reflections.

5. A compact, energy-recycling homogenizer module according to claim 2, further characterized in that:
    said homogenizer is hollow, comprising:
        a box enclosure set of two single-face mirror base members and two single-face mirror strips, each mirrored on one side only; forming an internally-mirrored box with open entry end and exit end;
        a single-face mirror strip having an entrance aperture as entry port, closing the entry end of said box enclosure set, with entry port near a first corner;
        a single-face mirror strip for use as a returning mirror opposite such entry port;
        a set of two dual-face mirror strips, mirrored on both sides, that are shorter than said single-face mirror strips, mounted within said box enclosure set 50 as to define an internally-mirrored, folded channel having an optical axis with two returns, from said first corner to a diagonally-opposite third corner; and transparent exit port means near said third corner.

6. A compact, energy-recycling homogenizer module according to claim 5, further characterized in that:
    said dual-face mirror strips overlap in the placement parallel to said optical axis.

7. A compact, energy-recycling homogenizer module according to claim 3, further characterized in that:
    said bulk optical material is configured into separate optical channels constructed by providing slots in said solid optical material such that resulting slot surfaces are substantially smooth to provide total internal reflection in the bulk channels.

8. A compact, high-efficiency, energy-recycling illumination system according to claim 4, further characterized in that:
    said bulk optical material is configured into separate optical channels constructed by providing slots in said solid optical material such that resulting slot surfaces are substantially smooth and mirrorized to provide internal reflection in the bulk channels.

9. A compact, energy-recycling homogenizer module according to claim 3, further characterized in that:
    said exit port is coated with an anti-reflective coating to minimize reflections.

10. A compact, energy-recycling homogenizer module according to claim 4, further characterized in that:
    said exit port is coated with a multilayer anti-reflective coating to minimize reflections.

11. A compact homogenizer module for use in an illumination system according to claim 1 further characterized in that:
    the cross-sectional shape of each of said optical channels is a square.

12. A compact homogenizer module for use in an illumination system according to claim 1 further characterized in that:
    the cross-sectional shape of each of said optical channels is a rectangle.

13. A compact homogenizer module for use in an illumination system according to claim 1 further characterized in that:
    the cross-sectional shape of each of said optical channels is a hexagon.

14. A compact homogenizer module for use in an illumination system according to claim 1 further characterized in that:
    the cross-sectional shape of each of said optical channels is a circle.

15. A compact homogenizer module for use in an illumination system according to claim 1 further characterized in that:
    the cross-sectional shape of each of said optical channels is a triangle.

16. A compact homogenizer module for use in an illumination system according to claim 1 further characterized in that:
    the cross-sectional shape of at least one of said optical channels is different from the cross-sectional shape of another channel.

17. A compact homogenizer module for use in an illumination system according to claim 1 further characterized in that:
    the cross-sectional shape of the first one of said optical channels is circular and the cross-sectional shape of the last channel is rectangular.

18. A compact homogenizer module for use in an illumination system according to claim 1 further characterized in that:
    the cross-sectional shape of the first one of said optical channels is circular and the cross-sectional shape of the last channel is hexagonal.

19. A compact homogenizer module for use in an illumination system according to claim 1 further characterized in that:

the cross-sectional shape of the first one of said optical channels is rectangular and the cross-sectional shape of the last channel is hexagonal.

20. A compact homogenizer module for use in an illumination system according to claim 1, further characterized in that:
the optical axes of the various channels form a bundle.

21. A compact, high-efficiency, energy-recycling according to claim 5, further characterized in that:
all mirrored surfaces are mirrorized by application of a reflective metal coating.

22. A compact, high-efficiency, energy-recycling illumination system according to claim 6, further characterized in that:
all mirrored surfaces are mirrorized by application of a reflective multilayer dielectric coating.

23. A compact, high-efficiency, energy-recycling illumination system according to claim 4, further characterized in that:
said mirrored surfaces are made reflective by application of a reflective metal coating.

24. A compact, high-efficiency, energy-recycling illumination system according to claim 4, further characterized in that:
said mirrored surfaces are made reflective by application of a reflective multilayer dielectric coating.

25. A compact energy-recycling homogenizer module for use in an illumination system according to claim 1 further characterized in that:
internally-reflecting surfaces of input face and output face are perpendicular to the optical axes of said optical channels; and
internally-reflecting walls of the optical channels are parallel to the optical axes of the channels.

26. A compact, energy-recycling homogenizer module for use in an illumination system characterized by:
a) folded optical channel means having a single entry position and a single exit position,
b) entry port means at said folded optical channel entry position;
c) a plurality of parallel, internally-reflective longitudinal surfaces in said folded optical channel;
d) a plurality of internally-reflective latitudinal surfaces in said folded optical channel, perpendicular to said longitudinal surfaces; and
e) exit port means at said folded optical channel exit;
whereby such folded optical channel provides a complex multi-reflection uniformizing effect as most rays of a bundle of light rays in an entering beam travel with multiple complex reflections from entry means to exit means, and some light rays that are reflected back toward said entry port means are re-reflected in the forward direction and returned for recycling.

27. A compact, energy-recycling homogenizer module according to claim 26, further characterized by:
a conical indentation in the region of the returning face of said homogenizer where central rays of the input beam are incident, so that such central rays are reflected at a specified angle from the optical axis.

28. A method of making a compact, energy-recycling homogenizer for use in an illumination system, according to the following steps:
Step 1) Arranging a first set of internally-reflective optical channel segments starting with an entry port and reflecting from an entry-channel reflective stop for return-forwarding a complex light beam bundle into a subsequent set of internally-reflective optical channel segments;

Step 2) Arranging the subsequent set of internally-reflecting optical channel segments to forward such complex light beam bundle, now more complex, in a generally reverse direction from said entry-channel reflective stop to reflect from a subsequent-channel reflective stop, which forwards an even more complex light beam bundle; and Step 3) Arranging a final set of internally-reflecting optical channel segments to receive such even more complex light beam bundle, now having been homogenized to maximum complexity as it transits such final optical channel in a generally forward direction from said subsequent-channel reflective stop as a homogenized light beam bundle at an exit port further characterized in that:
there is a single-channel path leading from entry port to exit port with reflective stops for reversals at ends of entry-channel and all subsequent-channels except final channel.

29. An assembled-box method of making a compact, energy-recycling homogenizer for use in an illumination system, according to claim 28, further characterized in the following:
providing homogenizer body having at least one segmented optical channel with a pair of parallel internally-reflective exterior wall plates, a pair of perpendicular internally-reflective ends and a set of doubly-reflective internally-reflective short plates, defining the zigzag channel in a homogenizing complex optical path from each input port to exit port, with the result that a light beam entering said input port travels a complex plural-returning reflective path to said output port.

30. An assembled-box method of making a compact, energy-recycling homogenizer according to claim 29, further characterized in that a single entry port is provided, leading into a complex plural-returning reflective path to a single output port.

31. An assembled-box method of making a compact, energy-recycling homogenizer according to claim 29, further characterized in that reflective metallization is used to form internal mirrors.

32. An assembled-box method of making a compact, energy-recycling homogenizer according to claim 29, further characterized in that multilayer dielectric coatings are used to form internal mirrors.

33. A slotted-block method of making a compact, energy-recycling homogenizer according to claim 28, further characterized by:
providing a solid block of an optical material;
providing slots in said solid block to delineate a complex set of optical channel segments operable for homogenization of entering light.

34. A slotted-block method of making a compact, energy-recycling homogenizer according to claim 33, further characterized in that:
there are two short slots, parallel to the axes of the optical channels and positioned at opposite ends of the block, provided with reflective means so as to define a complex, homogenizing segmented optical channel from a single entry port to a single exit port.

35. A slotted-block method of making a compact, energy-recycling homogenizer according to claim 33, further characterized in that said slots are mirrorized after fabrication.

36. A slotted-block method of making a compact, energy-recycling homogenizer according to claim 35, further characterized in that said slots are made capable of total internal reflection after fabrication, by at least one of chemical polishing, mechanical polishing, and chemical/mechanical polishing.

37. A slotted-block method of making a compact, energy-recycling homogenizer according to claim 35, further characterized in that said slots are mirrorized, after fabrication, by forming a reflective metallic coating on the inside surfaces of each slot.

38. A compact, high-efficiency, energy-recycling homogenizer module appropriately juxtaposible to accept radiation in a first format and to reformat such radiation to a processed format for optical projection characterized by:
 a) entry means, to accept radiation into such homogenizer;
 b) labyrinth means, optically subsequent to said entry means, having a plurality of internally-reflective longitudinally directing principally forwarding surfaces and having also a plurality of latitudinal directing principally returning surfaces, for a complex multi-reflection directing and returning intensity uniformization and energy-recycling light path; and
 c) exit re-entry means, to forward radiation for partial utilization and partial return for recycling.

39. A compact high-efficiency, energy-recycling illumination system according to claim 38, further characterized in that:
 said labyrinth means maintains numeric aperture and produces self-luminous radiation at said exit re-entry means.

40. A compact, high-efficiency, energy-recycling illumination system according to claim 39, further characterized in that:
 said labyrinth means provides a broad-spectrum self-luminous white light emission at said exit-re-entry means in response to a white light beam at said entry means, and recycles white light reflected back into said exit-re-entry means, processing such reflected light during such recycling so as to be self-luminous and with unchanged numeric aperture.

41. A compact, high-efficiency, energy-recycling illumination system according to claim 39, further characterized in that:
 said labyrinth means provides a narrow-spectrum self-luminous ultra-violet emission at said exit-re-entry means in response to a narrow-spectrum ultraviolet beam at said entry means, and recycles ultraviolet radiation reflected back into said exit-re-entry means, processing such reflected radiation during such recycling so as to be self-luminous and with unchanged numeric aperture.

\* \* \* \* \*